Oct. 17, 1961  E. A. HENRY  3,004,424
TANDEM PIEZOELECTRIC TRANSDUCERS
Filed Oct. 11, 1957

United States Patent Office 3,004,424
Patented Oct. 17, 1961

3,004,424
TANDEM PIEZOELECTRIC TRANSDUCERS
Elliott A. Henry, Newtown, Conn., assignor to Sperry Products, Inc., Danbury, Conn., a corporation of New York
Filed Oct. 11, 1957, Ser. No. 689,718
3 Claims. (Cl. 73—67.8)

This invention relates to piezoelectric transducers of the tandem type, as disclosed in my co-pending application Ser. No. 495,507, filed March 21, 1955 which is issued as Patent 2,888,824 on June 2, 1959. As stated therein, such transducers comprise piezoelectric elements separated by ultrasonic conducting material. Prior to the disclosure of a tandem transducer it was the practice in the ultrasonic inspection of materials to employ a single piezoelectric element in the form of a crystal of quartz or barium titanate which was periodically energized by a high frequency electric pulse to cause the crystal to transform it into a mechanical pulse which it transmitted into the object under inspection. Any reflections of the pulse from within the object were received by the same crystal and transformed into an electric signal which was impressed upon an amplifier. Since the crystal was connected to the amplifier, the initial energizing pulse of high voltage was also impressed on the amplifier, and this rendered the amplifier incapable of responding to the small signal voltages generated by reflections of the pulse from within the object under inspection until the amplifier had recovered from the initial shock. As a result it was impossible to test close to the surface of an object. The tandem transducer avoided this situation because separate crystals were employed for transmitting and receiving, both crystals scanning the same area. The transmitting or driving crystal was connected to the pulse generator, but not to the amplifier. The receiving or driven crystal alone was connected to the amplifier. Thus the amplifier was not subjected to the shock of the driving electrical wave train, isolation between the transmitter and the amplifier was achieved while maintaining the scan area equal to the area of a single crystal, and the returned echoes were not stretched so that the highest possible resolution was obtained.

In said co-pending application I disclosed that the driving crystal which is connected to the pulse generator has a natural frequency which is the same as the test frequency, while the driven crystal has a natural frequency much higher than the operating frequency and is therefore critically damped for operating frequency vibrations so that it will not overshoot or ring at the operating frequency. It is the principal object of the present invention to provide for a specific ratio of frequencies between the driving and driven crystals whereby there is obtained:

(a) Maximum close to surface resolution.
(b) Automatic cancellation of the electrical voltages generated by the tail of all wave trains.

Further objects and advantages of this invention will become apparent in the following detailed description thereof.

In the accompanying drawings.

Figure 1:
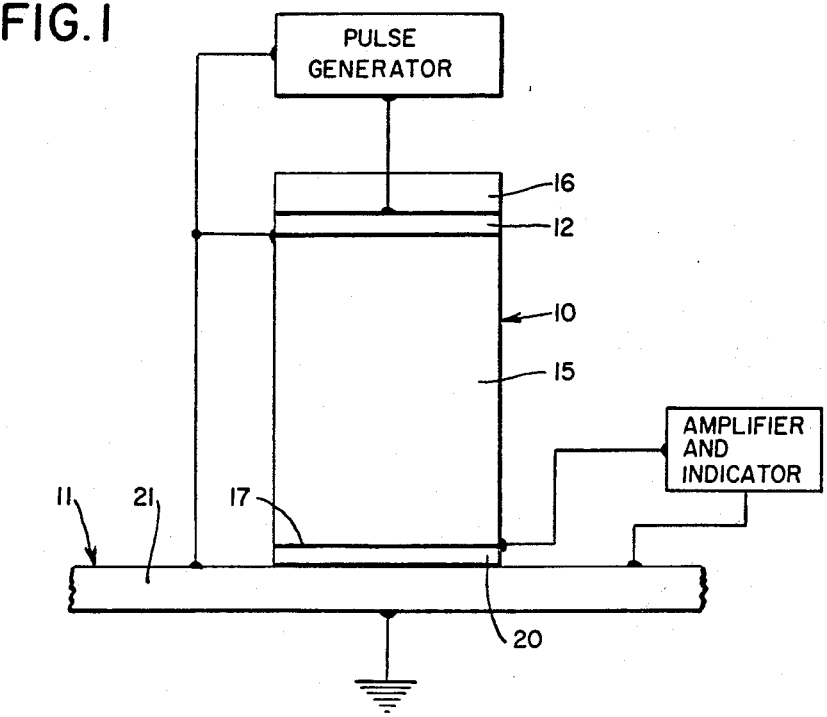
FIG. 1 is in part a front elevation of a transducer embodying this invention, and in part an electric wiring diagram.

Referring to FIG. 1, the transducer which embodies one form of this invention is indicated generally at 10 in engagement with an object to be inspected and indicated generally at 11. The transducer comprises a driving piezoelectric element 12 having a natural frequency in the thickness mode equal to the desired test frequency. One face of the element 12 (which may be a quartz or barium titanate crystal) is acoustically coupled to a coupling medium 15 which may comprise a solid or liquid column capable of transmitting high frequency vibrational waves, and preferably electrically non-conducting. The opposite face of element 12 is mechanically damped by the absorption backing material 16. One face of a second piezoelectric element 20 is acoustically coupled to the other end of the coupling medium 15 at 17, while the other face is arranged to engage the entering surface 21 of the object or test specimen 11. The natural frequency of the driven crystal 20 should be exactly twice that of the driving crystal 12, or have a natural frequency such that the one-way acoustic propagation time through it is equal to the period of an odd multiple of quarter waves at the frequency of the driving crystal. The beneficial and unobvious results which flow from this relationship of frequencies will be more fully described hereinafter.

Figure 2:
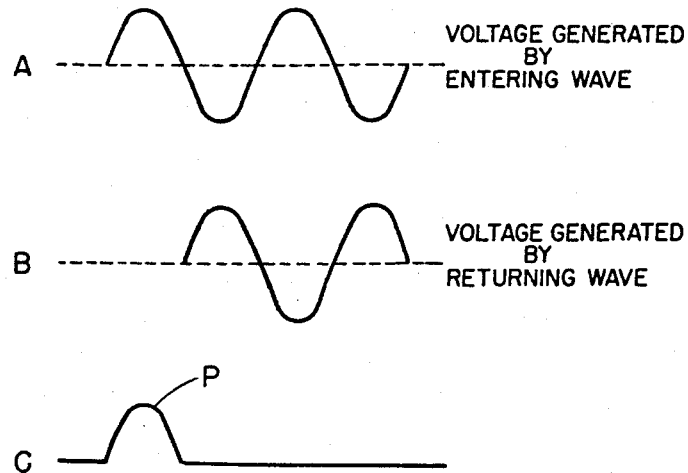
FIG. 2 is a series of graphs illustrating the principle embodied in this invention.

The driving crystal 12 is excited periodically by an electrical wave of either the step-function or saw-tooth variety. The physical length of the coupling medium 15 is such that the round trip propagation time of the pulse therein is slightly greater than the round trip propagation time in the test specimen. An acoustical wave comprising an exponentially decaying train of square waves is generated and coupled into the coupling medium. The acoustic wave train propagates through the coupling medium and encounters the interface 17 between the coupling medium and the driven crystal 20. The acoustic wave enters the driven crystal and propagates through it until it encounters the surface 21 of the test specimen. A portion of the energy will enter the test specimen while another portion will be reflected back through the driven crystal, the ratios depending upon the mismatch of impedances. If the frequency of the driven crystal is twice that of the frequency of the driving crystal, the energy reflected from this interface back through the crystal 20 will arrive at the entrant surface of this crystal 180° out of phase with the initial acoustic wave, and the voltage generated by the driven crystal 20 will be the algebraic sum of these two waves. The crystal 20 may be considered as being acted upon by two waves of opposite phase, one delayed by 180° with respect to the other. Referring to the graphs of FIG. 2 wherein it is assumed that the natural frequency of the driven crystal is exactly twice that of the driving crystal, it will be seen that by the foregoing state of facts, the electrical output of the driven crystal comprises only the first half cycle of the original energizing wave train because all subsequent half cycles are exactly nullified by the returning waves which are 180° out of phase with the entering half cycles. This result follows from the relationship of natural frequencies between the driving crystal and the driven crystal, the latter being such that the one-way acoustic propagation time through it is equal to the period of an odd multiple of quarter waves at the frequency of the driving crystal.

By the foregoing arrangement there is obtained a testing pulse of one-half cycle duration since it produces automatic cancellation of the electrical output due to all parts of the original wave train except the first half cycle. Extremely high (almost 100%) close to surface resolution can be obtained since there is practically no tail to interfere with the echoes being returned from the region close to the surface 11 of the test specimen. The amplifier 30 for amplifying the returned echoes is not affected by the generation of the original pulse and thus no loss of resolution due to its recovery time is experienced.

Having described my invention, what I claim and desire to secure by Letters Patent is:

1. An ultrasonic transducer for transmitting mechanical vibrations into an object, said transducer comprising a piezoelectric element adapted to be energized by electrical pulses to generate mechanical pulses, a sound conductive element in engagement with said piezoelectric element whereby said sound conductive element is vibrated mechanically, and a second piezoelectric element in engagement with the opposite end of the sound conductive element so as to be vibrated mechanically by the conductive element, said second piezoelectric element engaging the object to vibrate the object mechanically and to receive reflections of the pulse from within the object, the dimension of the sound conductive element being such that the round trip time of a propagated pulse therein is greater than the round trip time of the pulse in said object, the natural frequency of the second piezoelectric element being such that the one-way acoustic propagation time through it is equal to the period of an odd multiple of quarter waves at the frequency of the driving crystal.

2. An ultrasonic transducer as specified in claim 1, in which the natural frequency of the second piezoelectric element is exactly twice that of the first piezoelectric element.

3. A transducer assembly comprising: a first transducer adapted to be energized by an electrical signal to generate mechanical wave energy; a wave-energy-conductive element in coupling engagement with said first transducer whereby wave energy from said first transducer is propagated therethrough; and a second transducer in coupling engagement with the opposite end of said wave-energy-conductive element and adapted to be coupled to an object under test so as to introduce wave energy to the object and to receive wave energy reflections from the object, the dimension of said wave-energy-conductive element being such that the round-trip time of propagated wave energy therein is greater than the round-trip time of a wave energy propagated in the object, the natural frequency of said second transducer being such that the one-way acoustic propagation time through it is equal to the period of an odd multiple of quarter waves at the operating frequency of said first transducer.

References Cited in the file of this patent

UNITED STATES PATENTS

| | | |
|---|---|---|
| 2,467,301 | Firestone | Apr. 12, 1949 |
| 2,625,035 | Firestone | Jan. 13, 1953 |
| 2,651,012 | Van Valkenburg et al. | Sept. 1, 1953 |
| 2,888,824 | Henry | June 2, 1959 |

FOREIGN PATENTS

| | | |
|---|---|---|
| 638,285 | Great Britain | June 7, 1950 |
| 715,143 | Great Britain | Sept. 8, 1954 |
| 774,675 | Great Britain | May 15, 1957 |